W. H. POWELL.
DYNAMO ELECTRIC MACHINE.
APPLICATION FILED FEB. 27, 1915.

1,290,344.

Patented Jan. 7, 1919.

UNITED STATES PATENT OFFICE.

WILLIAM H. POWELL, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE.

DYNAMO-ELECTRIC MACHINE.

1,290,344.　　　　　Specification of Letters Patent.　　Patented Jan. 7, 1919.

Application filed February 27, 1915. Serial No. 11,404.

*To all whom it may concern:*

Be it known that I, WILLIAM H. POWELL, a citizen of the United States, residing at Milwaukee, in the county of Milwaukee and State of Wisconsin, have invented a certain new and useful Improvement in Dynamo-Electric Machines, of which the following is a specification.

This invention relates in general to dynamo-electric machines and has particular relation to the windings of such machines and to supporting and retaining means therefor.

In ordinary practice, with windings of the distributed type, it is desirable that the coils be formed as simply as possible in order that the length of copper required and the axial dimension of the wound element may be a minimum. To retain these two factors at a minimum, the adjacent end projecting portions of the winding are brought as nearly as possible into contact and the turn is made in the smallest axial space, with the result that the flow of ventilating currents in a radial direction through spaces between the extending end portions or end-turns of the coils is obstructed to an undesirable extent. Since, in the ordinary type of machine, the windings are arranged in at least two radially disposed layers, the end projecting portions of which extend in different directions from the portions disposed in the slots, and supporting and retaining means are usually provided for these end projecting portions on both the radially inner and outer sides thereof to properly maintain the same in position during operation, it will be apparent that the provision of sufficient air space through these end projecting portions of the windings to efficiently cool and ventilate the same is a serious one, especially since the supporting and retaining means wholly obstruct a considerable part of the spaces between these end projecting portions.

In accordance with this invention, the end-turns of the winding are so formed that the unobstructed ventilating space between adjacent end projecting portions is a maximum, and the length of conducting material in the end-turns and the axial length of the complete armature are maintained at a minimum.

It is an object of this invention to provide an improved construction of dynamo-electric machine of the distributed winding type.

It is a further object of this invention to provide an improved construction of winding for dynamo-electric machines.

It is a further object of this invention to provide a dynamo-electric machine of the distributed winding type wherein the end projecting portions of the winding are of improved construction.

It is a further object of this invention to provide a dynamo-electric machine of the distributed winding type wherein the end projecting portions of the winding are of improved construction and supporting and retaining means therefor are so disposed as to promote most efficient cooling and ventilation of the winding.

These and other objects are attained by this invention, the various novel features of which will appear from the description and drawings disclosing one embodiment of such invention, and will be particularly pointed out in the claims.

Figure 1:
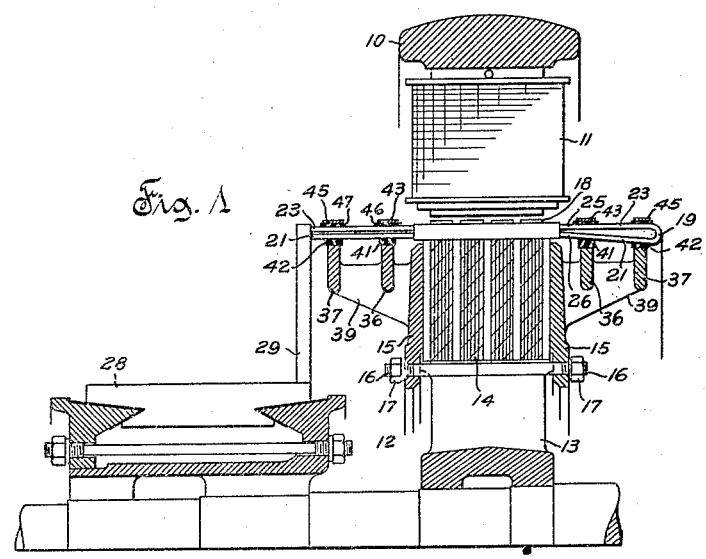
Figure 1 is a partial sectional view of a dynamo-electric machine embodying features of this invention.
Figure 2:
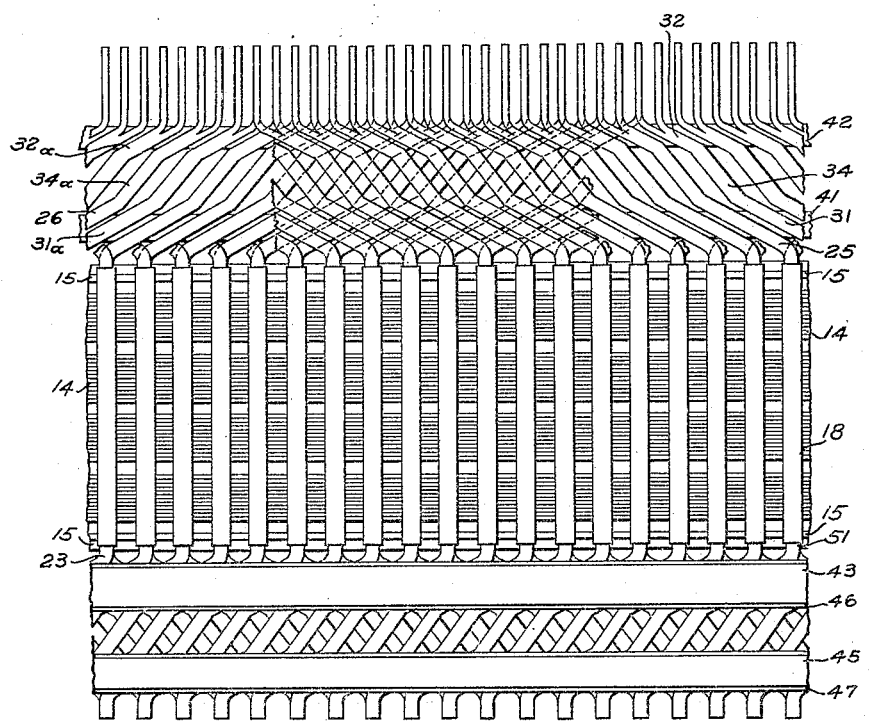
Fig. 2 is a partial development of the outer part of the armature core with the windings in place in slots therein, and showing a portion of the supporting and retaining means for the end turns of the winding.

In the drawings, wherein the invention is disclosed as embodied in a dynamo-electric machine of the rotating armature, commutator type, a field frame 10 is provided with windings 11, and a rotating armature 12 coöperates therewith. The armature comprises a spider 13 which supports a laminated core 14, the latter being held in position by means of end plates 15, bolts 16 and nuts 17 securing the end plates together and the core in place therebetween, the nuts 17 bearing on the outer sides of the plates 15. The core 14 is provided with the usual slots 18 at its outer periphery, and a winding 19 of the distributed type is disposed in these slots. As is usual in this type of machine, the winding 19 comprises an inner layer 21 and an outer layer 23, one side of each coil being disposed in the inner layer and the other side in the outer layer, the portions of the coil being shifted in position from one layer to another in the end-turns thereof which project axially beyond the core to a considerable extent. For present convenience, a coil may be considered as comprising parallel side portions the greater part of which occupy two slots, separated by the required distance, and usually extend to some extent beyond the ends of the slots, these portions being referred to as slot-occupying or inductor portions, that is, these portions of the coil are designed to be in direct inductive relation to the core, and end projecting portions or end-turns which connect the side or inductor portions together and to other coils at the ends of the core. Each end projecting portion or end-turn may be considered as comprising a portion 25 disposed in the outer layer and a portion 26 in the inner layer, these portions extending in angularly different directions from the inductor or slot-occupying portions of the coil and being bent from one cylindrical layer to another at their meeting point. The front end of the winding may be connected to a commutator 28, suitably held on the armature shaft by leads 29.

Instead of the end-turns comprising two straight portions, one in the inner layer and one in the outer layer and disposed at an angle to each other with adjacent portions in the same layer parallel throughout their length, each of the portions 25 and 26 comprises two approximately parallel straight portions 31 and 32 in the outer layer, and 31$^a$ and 32$^a$ in the inner layer, and a portion 34 connecting the portions 31 and 32 of the outer layer, and a portion 34$^a$ connecting the portions 31$^a$ and 32$^a$ of the inner layer, the portions 34 and 34$^a$, or these portions extended, meeting the adjacent slot portions of the coil, or an extension thereof, at an angle of incidence greater than the portions 31, 31$^a$ and 32, 32$^a$. With such an arrangement as is described, it will be apparent that the distance between the adjacent portions 34 or 34$^a$ in a circumferential direction is greater than the distance in a corresponding direction between adjacent portions 31 or 31$^a$ and 32 or 32$^a$.

In the ordinary construction of the type of machine described, supporting means for the end-turns are provided, the same usually being integral with or secured to the end plates 15. In the embodiment of the invention disclosed, circumferentially extending supporting elements 36 and 37 are supported by ribs 39 integral with or secured to the end plates 15. The end-turns of the winding are supported on these elements 36, 37, being spaced therefrom, as by insulating spacers 41 and 42, respectively. In order to secure the end projecting portions or end-turns of the winding against the action of centrifugal force, retaining bands 43 and 45 are used, the same being disposed radially outside of the supporting elements 36 and 37, respectively, and being separated from the windings, as by insulating spacers 46 and 47, respectively.

Since the spaces between those portions of the end-turns that are in radial alinement with the supports 36, 37, and the spacers 41, 42, on the inner side, and the bands 43, 45, and the spacers 46, 47, on the outer side, are necessarily obstructed by these retaining bands, supports and spacers, so as to prevent the passage of ventilating currents therethrough, it will be apparent that no considerable useful purpose is attained by separating these portions of the adjacent end-turns to any considerable extent. Accordingly, these portions may be bent so as to lie as close together as possible, in order that the axial length of the completed armature may be as small as possible; but, in the space that is unobstructed by the supporting and retaining means, the adjacent end turns may be spaced apart to a considerable extent to provide for the passage of sufficient ventilating currents to maintain the extending end portions of the winding at a proper operating temperature. It will be obvious that, although, in the structure illustrated, adjacent portions 31, 31$^a$ and 32, 32$^a$ are shown as being spaced apart to a slight extent, these portions may be practically in contact, and with the portions 34 bent at a proper angle to provide comparatively large spaces between such latter portions, efficient ventilation of the end-turns may be secured through these spaces.

In view of the fact that the inductor or slot-occupying portions of each coil are, in ordinary constructions, continued in a straight line beyond the core to some extent, as indicated at 51, ventilating spaces are produced between these adjacent straight portions 51 and between the core and the supporting means 36. In view of the fact that the inner and outer layers, especially at the outer ends of the end-turns, are usually spaced apart to some extent, there will be a flow of ventilating currents in an axial direction between these portions of the two layers, the air passing radially outward between the supports 36 and 37 and then in an axial direction through the separated end-turns of the winding.

This invention may be embodied in existing machines wherein the ventilation of the end-turns is defective through the absence of sufficient space between adjacent end-turns or through closure of existing spaces by insulation or paint, by reforming the end-turns of the coils to bring one portion thereof into such position that it makes a greater angle with the inductor or slot-occupying portion of the coil than does another portion. Improved ventilation may be secured in this manner without increasing the axial length of the complete winding.

It will be obvious that desirable results are to be secured with the end-turns of different form from that shown in the drawings and described above, the important consideration being that the coil-ends are so shaped as to localize the effective ventilating spaces at points where the passage of air through these spaces is least obstructed. Again, satisfactory results may often be attained by having the end projecting portions of the rotor-windings of only the radially inner layer provided with effective ventilating spaces, the greater part of the ventilating currents, in this latter construction, passing radially through these spaces and then axially through the spaced end portions of the turns.

It should be understood that it is not desired to be limited to the exact details of construction shown and described, for obvious modifications will occur to a person skilled in the art.

It is claimed and desired to secure by Letters Patent:

1. A coil for dynamo-electric machines comprising inductor portions and an end-turn connecting said inductor portions, said end-turn comprising connected portions extending at an angle from said inductor portions, and each of said connected portions of the end-turn comprising sections disposed at an angle to each other and in substantially the same plane as the associated inductor portion.

2. A coil for dynamo-electric machines comprising spaced and parallel inductor portions, and an end-turn connecting said inductor portions, said end-turn comprising connected portions extending from said inductor portions and at an angle thereto, and each of said connected portions comprising end sections one of which is adjacent said inductor portion and at an angle thereto, and an intermediate section at an angle to said end sections.

3. A coil for dynamo-electric machines comprising straight inductor portions, and an end-turn which connects two of said inductor portions, said end-turn comprising connected portions extending from said inductor portions and in a general direction at an angle thereto, each of said connected portions comprising two substantially parallel sections connected by an intermediate section disposed at an angle to said parallel sections.

4. A winding for dynamo-electric machines including coils having spaced, parallel inductor portions, and end-turns connecting said inductor portions, like portions of the end-turns of adjacent coils being parallel, and parts of said portions being spaced apart to different extents.

5. In a dynamo-electric machine provided with a slotted core, a distributed winding comprising parallel inductor portions occupying core slots and extending beyond said core, and end-turns each of which connects two of said inductor portions, said end-turns comprising portions extending in a general direction at an angle to said inductor portions, parts of said angularly extending portions of adjacent coils being spaced apart to different extents.

6. In a dynamo-electric machine having a core provided with slots, a distributed winding comprising parallel slot-occupying portions, and end-turns each of which connects two of said slot occupying portions, each of said end-turns comprising connected portions extending from said slot-occupying portions, those sections of said connected portions adjacent slot-occupying portions and the points of connection of said connected portions being spaced apart to a less extent than intermediate sections.

7. In a dynamo-electric machine, a core provided with slots, a distributed winding comprising parallel portions occupying and extending beyond said slots, and end-turns each of which connects two of said parallel portions, said end-turns comprising connected portions each extending in a general direction at an angle from one of said parallel portions, end parts of said connected portions adjacent said slot-occupying portions being at an angle to said latter portions, and a support for said end-turns, intermediate parts of the connected portions of adjacent end-turns being spaced apart to a greater extent at points out of radial alinement with said support than at points in radial alinement with said support.

8. In a dynamo-electric machine, a core provided with peripheral slots, a winding comprising parallel inductor portions disposed in said slots and extending beyond the end of said core, end portions connected to and disposed at an angle to said parallel inductor portions, and a support for said angularly disposed portions, adjacent angularly disposed portions being spaced apart to a greater extent at points at the side of said support in an axial direction toward the center line of the core than at points in radial alinement with said support.

9. In a dynamo-electric machine, a core provided with peripheral slots, a distributed winding having parallel portions disposed in said slots, and portions projecting from said parallel portions beyond the ends of said core and at an angle to said slot-occupying portions, and spaced supports for said end projecting portions, sections of said end projecting portions out of radial alinement with said supports being spaced apart to a greater extent than portions in radial alinement with said supports.

10. In a dynamo-electric machine, a core provided with peripheral slots, a winding in a plurality of layers having straight, parallel inductor portions disposed in said slots and projecting beyond the ends of said core, and portions extending from said inductor portions in a general direction at an angle thereto, spaced supports for said angularly extending portions, the layer of winding disposed in the inner portions of said slots bearing on said supports, and means engaging the layer of winding at the outer portions of said slots for retaining said angularly extending portions against said supports, portions of said angularly extending portions out of radial alinement with said supporting and retaining means being spaced apart to a greater extent than portions in radial alinement with said means.

11. In a dynamo-electric machine, a core provided with peripheral slots, a winding having parallel inductor portions disposed in said slots, and end-turns beyond said core and connecting said inductor portions, each of said end-turns comprising portions extending at an angle from a pair of said inductor portions and connected together at a point removed from said core, each of said connected portions comprising connected sections disposed at an angle to each other, and corresponding parts of said connected portions being substantially parallel, whereby the spaces between corresponding sections of adjacent end-turns are of different sizes.

12. In a dynamo-electric machine, a core provided with peripheral slots, a winding having parallel inductor portions disposed in said slots, and end-turns located beyond said core, each of said end-turns comprising connected portions connecting two of said inductor portions, and each of said connected portions comprising connected sections disposed at different angles of incidence to said inductor portions, and supports for said end-turns directly associated with only those sections that make the smaller angle of incidence with the inductor portions.

In testimony whereof, the signature of the inventor is affixed hereto in the presence of two witnesses.

WILLIAM H. POWELL.

Witnesses:
H. C. CASE,
J. J. KANE.

Copies of this patent may be obtained for five cents each, by addressing the "Commissioner of Patents, Washington, D. C."